May 5, 1959 J. G. YURTZ 2,885,504
AUTOMOBILE THEFT ALARM
Filed Aug. 18, 1955
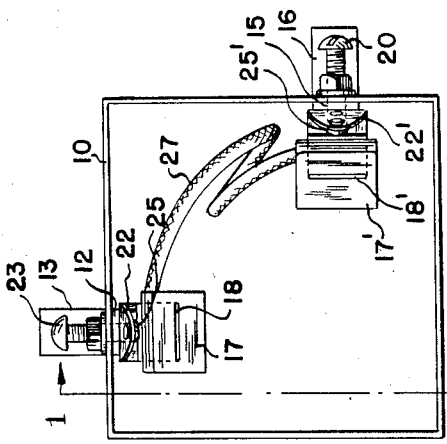
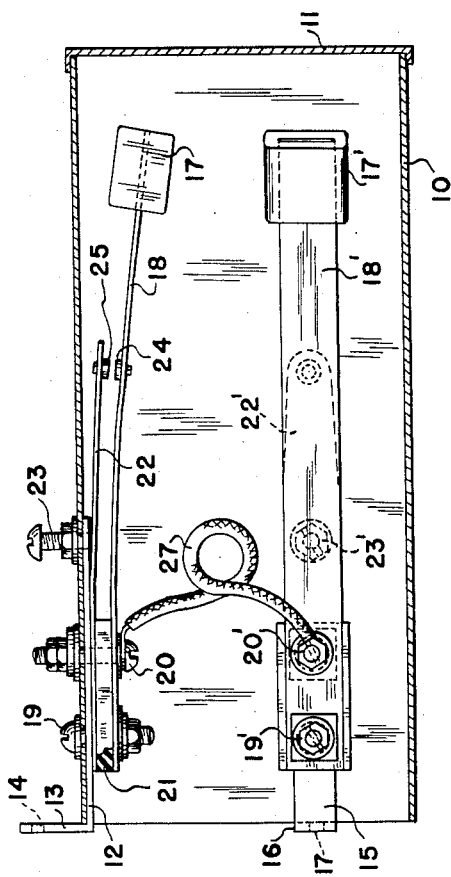
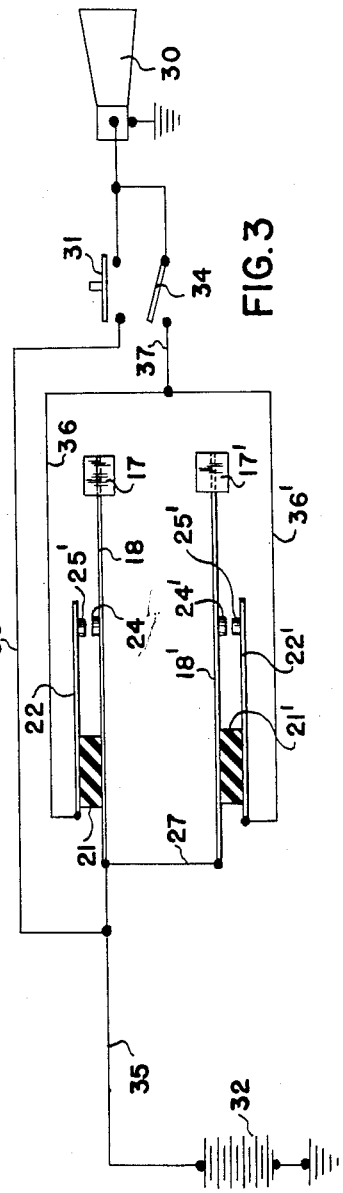
INVENTOR.
JOSEPH GREGORY YURTZ
ATTORNEYS United States Patent Office 2,885,504
Patented May 5, 1959

2,885,504

AUTOMOBILE THEFT ALARM

Joseph Gregory Yurtz, Cleveland, Ohio

Application August 18, 1955, Serial No. 529,110

1 Claim. (Cl. 200—61.49)

This invention relates to improvements in automobile theft alarms, in which the electric horn of the vehicle is sounded should an unauthorized person do anything to cause slight movement of some part of the vehicle.

The operation of the alarm is dependent upon sensitive vibrators suitably mounted in the vehicle, which serve when agitated to close an electric circuit between the car battery and the horn of the vehicle. When it is desired to disable the alarm system, the circuit may be broken by a secret switch the position of which is known only to the car owner or other authorized persons.

An important feature of the invention is the use of two vibrators set at an angle to each other, one being set preferably to be responsive to vibrations in a vertical plane and the other to vibrations in a horizontal plane, these vibrators being arranged in parallel in the electric circuit so that the horn will be sounded upon the slightest agitation of the vehicle and so that its operation although subject to rapid pulsations will be generally continuous in the event that an unauthorized person actually enters the car.

One of the objects of the invention therefore is the provision of a theft alarm system for vehicles which shall be highly sensitive and which at a relatively low cost shall provide a substantially continuous alarm in the event of an attempted theft.

Other objects and features of novelty will appear as I proceed with the description of that embodiment of the invention which, for the purposes of the present application I have illustrated in the accompanying drawing, in which Fig. 1 is a vertical sectional view taken substantially on the line 1—1 of Fig. 2, showing a casing in which the essential parts of a pair of vibrators for setting off the alarm.

Fig. 2 is an end view of the same with an end wall removed, and

Fig. 3 is a diagrammatic view showing horn circuits which may be employed in carrying out the invention.

In the drawing there is shown a metal or other rigid casing 10 of elongated rectangular form which may be open at one end and closed at the other end by an end wall 11. Although shown with four flat sides as the preferred construction, the casing could be cylindrical if desired. Underneath the top wall there is attached thereto a metal plate 12 which has a bent-over foot 13 that is perforated at 14 to receive a fastening bolt or screw. Another plate 15 is attached to one side wall of the casing and ends in a foot 16 provided with a perforation 17 to receive a fastening. By means of the feet 13 and 16 the casing may be mounted rigidly upon any protected flat wall of the vehicle.

The system comprises two vibrators arranged to oscillate in directions at right angles to each other in response to vibrations in planes at right angles to each other, and of course in varying degrees responsive to vibrations occurring in planes inclined to both of said right-angularly disposed planes. The vibrators may be essentially alike and therefore a particular description of one will serve for both.

A flat spring finger 18 is supported from the casing by a fastening 19 and by a binding screw 20, both of these attaching means extending through a block 21 of insulation material which serves to separate the finger electrically from the casing 10. A weight 17 of substantial mass is carried at the free end of the finger, the weight serving to sustain vibrations when they have been set up. On the outer side of insulation block 21 there is a leaf spring 22, the position of which may be adjusted by a binding screw 23 which also maintains electrical contact with the leaf spring. The spring finger 18 and the leaf spring 22 carry opposed contacts 24 and 25 which are adapted to engage each other when the spring finger vibrates in the vertical direction or at right angles to the flat surface of the finger.

The same reference numerals primed are applied to the parts of the second vibrator. The two binding screws 20, 20' may be connected electrically by a conductor 27. Spring finger 18' oscillates when subjected to vibrations in a horizontal direction, and when vibrated causes contacts 24', 25' to engage.

The operation of the system will be apparent upon an inspection of Fig. 3. 30 represents a conventional automobile horn which may be sounded for ordinary operation in traffic by means of a horn button 31, usually positioned on the steering wheel, the circuit taking its operating current from the regular car battery 32 through a conductor 33. 34 is the secret switch which is open during authorized operation of the vehicle. When the operator parks the car he closes switch 34. Then if some unauthorized person disturbs the car in any manner, as by opening a car door or attempting to remove a tire or some accessory, one or the other or both of the spring fingers 18 or 18' will be vibrated slightly, closing momentarily one or both pairs of contacts 24, 25, or 24', 25'. A circuit is thus set up from battery 32 through conductor 35 to the spring finger 18 for example, contacts 24, 25, leaf spring 22 and conductors 36 and 37 to closed switch 34, to the horn and back to the battery through ground. The spring fingers 18 and 18' being arranged in parallel, the circuit will be completed through either one, depending upon the direction of vibration resulting from the force applied to the vehicle by the person attempting theft. Ordinarily the vibrations will be mixed, particularly if a thief enters the car and attempts to drive it away, in which event one or the other set of contacts will be engaged the major part of the time and the sounding of the horn will be continuous or approximately continuous, although pulsating.

Thus for all practical purposes I obtain at relatively low cost by the use of two simple vibrators, a result substantially equivalent to that obtained by devices embodying complicated electrical equipment designed to maintain the alarm circuit closed for a greater or lesser period of time after it has been triggered by an unauthorized person.

Having thus described my invention, I claim:

In a circuit closer of the character described for actuation upon slight motion and adapted to be included in the energizing circuit of an electrically actuated signal means, a casing adapted to be mounted on and electrically connected to a vehicle having such signal means, a pair of horizontally disposed vibrators each comprising a flat spring finger fixedly mounted at one end in the casing and a weight at the free end of each finger, a pair of normally open contacts for each vibrator one of which contacts of each pair is insulated from said casing and carried by a finger and the other of which is adjustably mounted in said casing, one of said fingers being mounted with its flat dimension horizontally disposed and adapted to swing vertically, the other of said fingers being mounted with its flat dimension vertically disposed and adapted to swing horizontally, the one and the other of said fingers and their weights being swingable to close said contacts by jarring motion of said casing in directions having vertical and horizontal components respectively, a binding post insulated from said casing, and electric conductor means connecting said contacts carried by said fingers to each other and to said binding post, said adjustably mounted contacts being electrically connected to said casing and said circuit closer being adapted to be connected by said binding post and said casing into said energizing circuit whereby upon closing of either of said pairs of contacts said energizing circuit will be closed and said signal means actuated.

References Cited in the file of this patent

UNITED STATES PATENTS

| | | |
|---|---|---|
| 1,779,986 | Scott | Oct. 28, 1930 |
| 1,846,966 | Hausse | Feb. 23, 1932 |
| 2,344,854 | Dempsey | Mar. 21, 1944 |
| 2,448,597 | Jolley | Sept. 28, 1948 |
| 2,662,945 | Cockram | Dec. 15, 1953 |

FOREIGN PATENTS

| | | |
|---|---|---|
| 363,553 | Germany | Nov. 10, 1922 |
| 416,057 | France | July 28, 1910 |
| 459,856 | Italy | Oct. 6, 1950 |